United States Patent [19]

Onishi et al.

[11] Patent Number: 5,331,017

[45] Date of Patent: Jul. 19, 1994

[54] BLOWING AGENTS OF THE TETRAZOLES AND THEIR DERIVATIVES

[75] Inventors: Atsuhiro Onishi, Takasago; Koichi Matsunami, Toyonaka; Masanao Ebara; Hiroaki Tanaka, both of Takasago, all of Japan

[73] Assignee: Toyo Kasei Kogyo Company, Limited, Japan

[21] Appl. No.: 78,054

[22] Filed: Jun. 18, 1993

Related U.S. Application Data

[60] Division of Ser. No. 941,836, Sep. 8, 1992, which is a continuation-in-part of Ser. No. 798,561, Nov. 26, 1991, abandoned.

[30] Foreign Application Priority Data

Nov. 26, 1990 [JP] Japan ................................ 1-324953
Aug. 26, 1991 [JP] Japan ................................ 3-240402

[51] Int. Cl.$^5$ ............................................. C08J 9/10
[52] U.S. Cl. .................................... 521/90; 521/128; 548/250; 548/252
[58] Field of Search ................ 521/90, 128; 548/250, 548/252

[56] References Cited

U.S. PATENT DOCUMENTS

| 2,020,937 | 11/1935 | Foldi | 548/250 |
| 3,138,609 | 6/1964 | Carpenter | 548/250 |
| 4,774,266 | 9/1988 | Boudakian et al. | 521/90 |
| 4,873,477 | 3/1975 | Beck et al. | 548/250 |
| 4,885,316 | 12/1989 | Rothgery et al. | 521/90 |

FOREIGN PATENT DOCUMENTS

| 1197214 | 7/1970 | United Kingdom . |
| 1542055 | 3/1979 | United Kingdom . |
| 1569683 | 6/1980 | United Kingdom . |

Primary Examiner—Morton Foelak
Attorney, Agent, or Firm—Wenderoth, Lind & Ponack

[57] ABSTRACT

Blowing agents of tetrazoles and their derivatives which have a melting point over 200° C. and are used to manufacture the high quality foaming thermoplastic synthetic resin moldings, especially engineering or superengineering plastic moldings and said blowing agents generate no harmful gases and do not cause the deterioration of the thermoplastic synthetic resin moldings.

5 Claims, No Drawings

BLOWING AGENTS OF THE TETRAZOLES AND THEIR DERIVATIVES

This is a divisional of Ser. No. 07/941,836, filed Sep. 8, 1992 which is a pending continuation-in-part of Ser. No. 07/798,561 filed Nov. 26, 1991.

BACKGROUND OF THE INVENTION (1) Field of the Invention

The present invention relates to tetrazole blowing agents and their derivatives which are used to manufacture foamed thermoplastic resin moldings (hereinafter referred to as the cell structured artificial plastics) which have a high melting point and high softening point, i.e. the tetrazoles and their derivatives are the blowing agents to be used for the cell structured artificial plastics which have high quality and have no shrink and no warp and accordingly have various uses.

(2) Description of the Prior Art

Formerly, as the blowing agents for the manufacture of foamed thermoplastic synthetic resins, liquid hydrocarbons or volatile hydrocarbons such as propane, butane, pentane and heptane or the blowing agents which are decomposed at low temperature such as diazo type blowing agents were used in the fixed molding process.

SUMMARY OF THE INVENTION

Formerly, blowing agents which were used for the ordinary foamed synthetic resin plastic moldings are low in vaporization temperature and thermal decomposition temperature and so the synthetic resins in which are used said blowing agents are limited to the ordinary synthetic resins which have low melting points, but recently thermoplastic engineering plastic moldings have been in increased demand, and moreover due to the development of thermoplastic superengineering plastic moldings containing liquid crystals, the demand for the high quality cell structured artificial plastics is increasing. However, generally, ordinary blowing agents are not used for engineering plastic moldings or superengineering plastic moldings which have high melting points or high softening points compared with ordinary thermoplastic moldings and so, the above described high quality foamed resins are not manufactured by using the said ordinary blowing agents.

The object of the present invention is to provide blowing agents which have the following properties (a)–(c) such that they may be used in the manufacture of high quality thermoplastic synthetic resin moldings:

(a) The thermal decomposition temperatures are at least over 200° C.

(b) A large quantity decomposition gases (non-toxics) are generated, accompanied by the decomposition of the blowing agents.

(c) The decomposition gases do not include gases which cause the deterioration or degradation of the thermoplastic synthetic resins to occur, such as ammonia or alcohol.

DETAILED DESCRIPTION OF THE INVENTION

To attain the above described object, the present inventors confirmed that the below described tetrazoles and their derivatives satisfy the above properties (a)–(c). As the result of their investigation, the present inventors have discovered that by using these tetrazoles and their derivatives as blowing agents, the manufactured cell structured artificial plastics have no shrink and warp and the manufactured products are excellent, and so the inventors of the present invention completed the present invention. Namely the present invention relates to single or plural tetrazoles and their derivatives which have the following structural formulas used for the manufacture of the foamed thermoplastic synthetic resins.

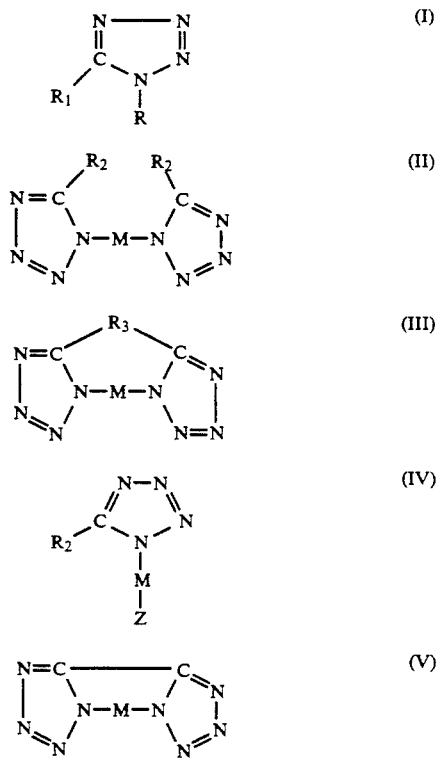

where

R and $R_1$ are the same or different and are selected from the group consisting of H, $C_1$ to $C_6$ alkyl, $C_3$ to $C_6$ cycloalkyl, $C_2$ to $C_6$ alkenyl radicals optionally substituted by one or more $C_1$ to $C_6$ alkyl, —OH, —COOH, $SO_3H$, $NO_2$, halogen and —$NR_4R_5$, wherein $R_4$ and $R_5$ may each be H or $C_1$–$C_4$ alkyl or R and $R_1$ can be phenyl, benzyl or phenethyl radicals optionally substituted by 1 to 3 halogens, —OH, $NO_2$, —CN, —COOH and $NR_4R_5$ wherein $R_4$ and $R_5$ are as defined above;

$R_2$ is selected from H, —OH, —COOH, —$SO_3H$, —$NO_2$, halogen or —$NH_4R_5$ wherein $R_4$ and $R_5$ are as defined above, $C_1$ to $C_6$alkyl, $C_3$ to $C_6$ cycloalkyl or $C_2$ to $C_6$ alkenyl, optionally substituted by $C_1$ to $C_6$ alkyl, —OH, —COOH, —$SO_3H$, —$NO_2$, halogen, —$NR_4R_5$ wherein $R_4$ and $R_5$ are as defined above or $R_2$ can be phenyl, benzyl or phenethyl radicals optionally substituted by 1 to 3 halogens, —OH, $NO_2$, —$NR_4R_5$, wherein $R_4$ and $R_5$ are as described above, $C_1$ to $C_4$ alkyl and esters or amides of lower carboxylic acids;

$R_3$ is selected from the group consisting of $C_5$ to $C_6$alkylene, cycloalkylene, or alkenylene, optionally substituted by $C_1$ to $C_6$ alkyl, —OH, —COOH, $SO_3H$, —$NO_2$, halogen or $NR_4R_5$, wherein $R_4$ and $R_5$ are as defined above, the alkylene, cycloalkylene or alkenylene radicals optionally containing —O—, —S—, —$SO_2$, —CO—, phenylene and bisphenylene being optionally substituted by 1 to 8 halogens, —OH, —NO$_2$, esters or amides, lower carboxylic acids, —NR$_4$R$_5$ wherein R$_4$ and R$_5$ are as defined above, C$_1$ to C$_4$ alkyl;

M is a divalent metal selected from Ca, Cu, Zn, Mn, Fe, Co, Ni and Ba, and Z is a univalent inorganic or organic radical which may bind to or form a salt with M, such as SO$_4$, NH$_4$, —HCO$_3$, —HPO$_4$, —NO$_3$, —ONH$_4$, —CH$_3$, —C$_2$H$_5$, —CHO, NH$_2$ or SO$_3$H.

One or more of the above compounds may be employed and the compounds employed have higher melting points or the softening points than the thermoplastic synthetic resins used, and the amount of the above tetrazole derivatives employed is 0.01–15 weight % per 100 weight % of the thermoplastic synthetic resins.

In the case where the amount of blowing agents used is under 0.01 weight %, the foaming degree of the thermoplastic synthetic resins is inferior, and in the case when the amount of the blowing agents used is over 15%, such amount of blowing agents is excessive and thus the foamed synthetic resin molding properties and the resultant foamed molding products are inferior, and thus, both cases can not be used in the present invention.

As described above, the blowing agents of the present invention have the higher thermal decomposition temperature than the melting points or the softening points of the thermoplastic synthetic resins used, and furthermore the thermal decomposition points of the blowing agents are very sensitive to the thermal decomposition at a higher molding temperature than the temperature of melting points or softening points of the thermoplastic synthetic resins.

A fixed quantity of the blowing agents is added to the master batch (polymer premixed with concentrated blowing agents) of the thermoplastic resins treated previously to make a chip or pellet which has mutual solubility with the thermoplastic synthetic resins and the thus treated thermoplastic synthetic resins are used for molding.

The thermoplastic synthetic resins to be used for the present invention are not especially limited, but the thermoplastic resins which can be used for the present invention are selected from the below described group, i.e. polyolefins, fluoropolymers, acrylonitrile-butadiene-styrene resins, polystyrene, polyvinyl chloride (PVC) polyacrylates, polyamide, polycarbonate (PC), polyphenylene oxides (PPC), polyethylene terephthalates (PEC), polybutylene terephthalates (PET), polyphenylene sulphides (PPS), polyether sulfones (PES), polyimide amides (PAI), polyether imides (PEI), polyether ether ketones (PEEK), polysulfonates (PSF), liquid crystal polymers (LCP), polytetrafluoroethylene (PTFE) or their copolymers or polymers.

And the antioxidant, ultraviolet light absorption reagents, dyes, pigments, fillers or the reinforcing fibers, etc., can be blended with the thermoplastic resins.

In order to manufacture the thermoplastic synthetic resin moldings of the present invention, injection molding, extrusion molding, blowing molding, press molding or any other molding can be used.

For instance, in injection molding, the amount of additional tetrazole blowing agents used in the molding machine is selected according to the purpose of the molding product and these blowing agents are mixed with the thermoplastic synthetic resins and the mixed products are injection molded by the ordinary method or by the extrusion molding method by using a 2 axis extrusion molding machine.

The desired thermoplastic synthetic resins and tetrazole blowing agents which are mixed with the thermoplastic synthetic resins are separately introduced into the hopper and firstly the desired thermoplastic synthetic resins are separately introduced into the hopper and then the fixed amount of desired thermoplastic synthetic resins is extruded, and thermoplastic resins mixed with the tetrazole blowing agents are extruded according to the ordinary molding method. In this case, in order to prevent shrink and warp, the full shot method or slightly shot method of molding are preferable, and also it is preferable that the metal mold is kept under slightly reduced pressure or slightly short shot to obtain a comparatively higher foaming rate. And moreover, in the case of the injection molding method, by using the coinjection molding, from the same or different thermoplastic synthetic resins mixed with the blowing agents of the present invention, different kinds of thermoplastic synthetic resins can be manufactured where the non-foamed thermoplastic synthetic resins exist at the surface layer and the thermoplastic synthetic resins having the foams with high ratio exist in the interior of the product, and injection moldings which shrink and warp are improved so that they may be used in applications which require surface smoothness and dimensional accuracy.

And moreover, by using an extruder, various types of extrusion moldings can be manufactured by the conventional method e.g. fibers or films or sheets or other various types of extrusion foamed moldings using the thermoplastic synthetic resins including the blowing agents of the present invention.

And, by using the blowing agents of the present invention, from the foamed thermoplastic synthetic resin portions together with the non-foamed thermoplastic synthetic resin portions, the conjugate fibers or coextruded fibers or sheets, extruded laminate fibers or sheets can be manufactured.

And also, instead of the manufactured thermoplastic synthetic resin portion, paper, metals, ceramics or other materials can be used. These foamed moldings have the characteristics of light weight, adiabatic property, good cushioning property, beautiful appearance and shielding of light and have various available uses.

EXAMPLE

Example 1

(1H)-tetrazole (decomposition temperature 241° C.) is added to the copolymerized nylon based on 12-Nylon [—NH(CH$_2$)$_8$CO-]poly(9-amino nonanoic acid) 5 weight % and melted and the chips are made from them, and these chips are mixed with the 6-Nylon [NH(CH$_2$)$_3$CO]poly (melting point 215° C.) 6.25, 8.0, 4.0 weight % each and then these are injection molded using test metal mold (length 60 mm, breadth 40 mm and thickness 5 mm) according to the conditions of Table 1 and the results are summarized in Table 1.

TABLE 1

| Addition Quantity (%) | Injection Temperature (°C.) | Molding Tem. (°C.) | Condition | Specific Gravity | Foaming Rate (Multiple) |
|---|---|---|---|---|---|
| 0.125 | 250 | 70 | No. 1 | 1.13 | 1.002 |
|  |  |  | 2 | 1.10 | 1.025 |
|  |  |  | 3 | 1.06 | 1.050 |
|  |  |  | 4 | 1.05 | 1.075 |

TABLE 1-continued

| Addition Quantity (%) | Injection Temperature (°C.) | Molding Tem. (°C.) | Condition | Specific Gravity | Foaming Rate (Multiple) |
|---|---|---|---|---|---|
|  |  |  | 5 | 0.99 | 1.125 |
| 0.25 |  |  | No. 1 | 1.12 | 1.005 |
|  |  |  | 2 | 1.07 | 1.050 |
|  |  |  | 3 | 1.05 | 1.075 |
|  |  |  | 4 | 0.95 | 1.125 |
|  |  |  | 5 | 0.94 | 1.175 |
| 0.50 |  |  | No. 1 | 1.10 | 1.025 |
|  |  |  | 2 | 1.05 | 1.060 |
|  |  |  | 3 | 1.02 | 1.100 |
|  |  |  | 4 | 0.95 | 1.175 |
|  |  |  | 5 | 0.90 | 1.250 |

Wherein: Injection conditions are as follows:
No. 1 full shot
No. 2 3.7% short shot
No. 3 7.4% short shot
No. 4 11.1% short shot
No. 5 14.5% short shot

Example 2

Molding results by the full shot injection condition are summarized in Table 2.

TABLE 2

| NO | Blowing Agent Addition Quantity | Decomposition Temp. (°C.) | Kind of thermoplastic resins | Molding Temp. (°C.) | Foaming Rate (Multiple) | Property of Molding foaming form formability (shrink, warp) |
|---|---|---|---|---|---|---|
| 1 | (a) 0.125 | 283 | Modified PPE | 290 | 1.002 | Surface, beautiful no shrink no warp |
| 2 | (b) 0.200 | 285 | PC | 300 | 1.004 | Surface, beautiful no shrink, slightly warp |
| 3 | (c) 0.125 | 276 | PET | 285 | 1.003 | Surface, beautiful no shrink, no warp |
| 4 | (d) 0.200 | 276 | PBT | 280 | 1.003 | Same as above |
| 5 | (e) 0.125 | 262 | 66 Nylon | 275 | 1.002 | Same as above |

Wherein: Structural formula of the used tetrazoles in Table 2 (a)–(e) are as follows:

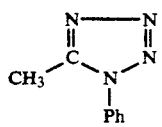
(a)

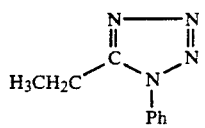
(b)

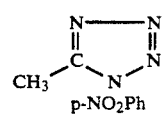
(c)

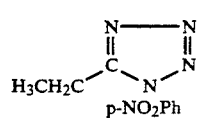
(d)

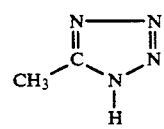
(e)

Wherein p is the para position and Ph is phenyl.

Example 3

The results of molding of 10% short shot injection molding are summarized in Table 3.

TABLE 3

| NO | Blowing Agent Addition Quantity | Decomposition Temp. (°C.) | Kind of thermoplastic resins | Molding Temp. (°C.) | Foaming Rate (Multiple) | Property of Molding foaming form formability (shrink, warp) |
|---|---|---|---|---|---|---|
| 1 | (a) 0.125 | 282 | Modified PPE | 290 | 1.092 | -Foaming, fine -surface, good -no shrink, no warp |
| 2 | (b) 0.200 | 285 | PC | 300 | 1.104 | Same as above |
| 3 | (c) 0.125 | 276 | PET | 285 | 1.093 | Same as above |
| 4 | (d) 0.200 | 276 | PBT | 280 | 1.098 | Same as above |
| 5 | (e) 0.125 | 262 | 66 | 275 | 1.089 | Same as |

TABLE 3-continued

| NO | Blowing Agent Addition Quantity | Decomposition Temp. (°C.) | Kind of thermoplastic resins | Molding Temp. (°C.) | Foaming Rate (Multiple) | Property of Molding foaming form formability (shrink, warp) |
|---|---|---|---|---|---|---|
|  | 0.125 |  | Nylon |  |  | above |

Wherein: (a)–(e) in Table 3 are same as in Table 2.

Example 4

After mixing 5 weight % powder of the 1-p-nitrophenol-5-ethyl- tetrazole with the copolymerized polyester powder (M.P. 140° C.), this mixture is melt extruded and granulated, and a fixed amount of the granulated particles is mixed with the polyethylene terephthalate resin chips having the limiting viscosity 0.72 (measured in the solution of tetrachloroethane/phenol=2:3 at 30° C.) and these are dried under reduced pressure and after regulating the water content to under 50 ppm, the temperature of the resins is raised to 280° C. and the resultant resin is melted, extruded as a roll, and solidified on cooling and formed into a sheet having a thickness of 5 mm. The properties of the obtained sheets are summarized in Table 4.

Comparative Experiment 1

Polyethylene terephthalate resins which are the same as used in Example 4, are melted and manufactured, the extruded sheets are formed under the same conditions as Example 4 and the properties of sheet are recorded in Table 4.

TABLE 4

|  | Blowing Agent Addition Quantity (5) | Appearance | Density | Foaming Rate (multiple) |
|---|---|---|---|---|
| Experiment 4 | 0.125 | White Opaque | 1.20 | 1.12 |
|  | 0.25 | Same as above | 1.11 | 1.21 |
|  | 0.50 | Same as above | 1.02 | 1.32 |
| Comparative Experiment 1 | — | Semitransparent | 1.35 | — |

Example 5

Crystalline Cu salt of 5-methyl-1H-tetrazole (a) (decomposition temperature (287° C.) which is finally pulverized with the mortar is added in the amount shown by Table 5 to the PPS (polyphenylene sulphide) M.P. 227°0 C.) and mixed carefully so that (a) adheres uniformly to the chip surface of the PPS and the chips are melted and injection molded under the same conditions shown in Table 5, and the results are summarized in Table 5.

TABLE 5

| Addition Qty (%) | Injection Temp. (°C.) | Die Temp. (°C.) | Injection Condition | Foaming Rate (multiple) |
|---|---|---|---|---|
| 0.125 | 320 | 140 | No. 1 | 1.002 |
|  |  |  | 2 | 1.025 |
|  |  |  | 3 | 1.05 |
|  |  |  | 4 | .075 |
|  |  |  | 5 | 1.125 |
| 0.25 |  |  | No. 1 | 1.005 |
|  |  |  | 2 | 1.50 |
|  |  |  | 3 | 1.075 |
|  |  |  | 4 | 1.125 |
|  |  |  | 5 | 1.175 |
| 0.50 |  |  | No. 1 | 1.025 |
|  |  |  | 2 | 1.060 |
|  |  |  | 3 | 1.100 |
|  |  |  | 4 | 1.175 |
|  |  |  | 5 | 1.125 |

Wherein: Injection condition
No. 1: full shot
No. 2: 3.7% short shot
No. 3: 7.4% short shot
No. 4: 11.1% short shot
No. 5: 14.5% short shot

Example 6

According to Example 3, the foamed plastics are manufactured using various plastics and the results are summarized in Table 6.

TABLE 6

| NO | Blowing Agent Addition Quantity | Decomposition Temp. (°C.) | Kind of thermoplastic resins | Molding Temp. (°C.) | Foaming Rate (Multiple) | Property of Molding foaming form formability (shrink, warp) |
|---|---|---|---|---|---|---|
| 1 | (a) 0.125 | 287 | PPS | 320 | 1.002 | -Surface beautiful - no shrink, no warp |
| 2 | (b) 0.150 | 322 | PEI | 360 | 1.007 | Same as above |
| 3 | (c) 0.200 | 363 | PES | 370 | 1.013 | Same as above |
| 4 | (d) 0.125 | 376 |  | 390 | 1.003 | -Surface beautiful - No shrink, no warp |
| 5 | (e) 0.150 | 399 | PPEK | 400 | 1.506 | Same as No. 1 |

Wherein: The blowing agents used in the Table 6 are as follows:

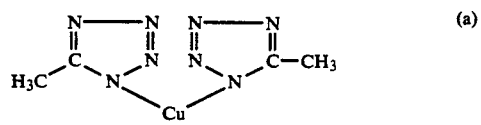

(a)

-continued

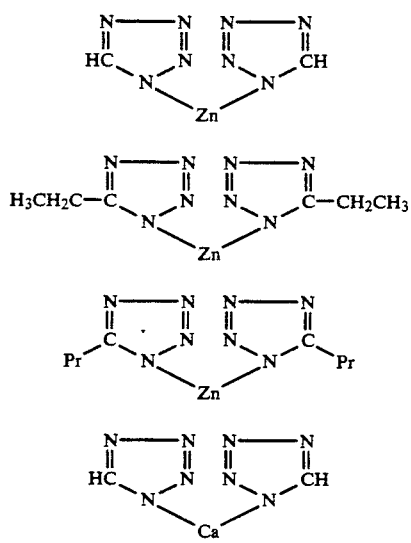

Wherein: Pr is —CH$_2$CH$_2$CH$_3$

Example 7

Similar to Examples 3 and 4, blowing agents are added to the thermoplastic synthetic resins described in Table 7 and molded to 10% short shot, and the results are summarized in Table 7.

TABLE 7

| NO | Blowing Agent Addition Quantity | Decomposition Temp. (°C.) | Kind of thermoplastic resins | Molding Temp. (°C.) | Foaming Rate (Multiple) | Property of Molding foaming form formability (shrink, warp) |
|---|---|---|---|---|---|---|
| 1 | (f) 0.125 | 287 | PPS | 320 | 1.062 | -Foaming fine -Surface beautiful -no shrink, no warp |
| 2 | (g) 0.1 | 322 | PEI | 360 | 1.118 | Same as above |
| 3 | (h) 0.200 | 363 | PES | 370 | 1.125 | Same as above |
| 4 | (i) 0.125 | 376 | | 390 | 1.073 | Same as above |
| 5 | (j) 0.150 | 399 | PPEK | 400 | 1.119 | Same as No. 1 |

Wherein: The blowing agents (f)–(j) in Table 7 are as follows:

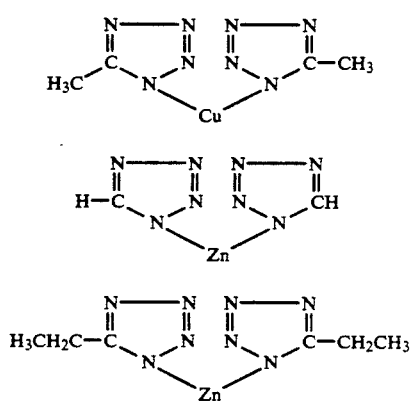

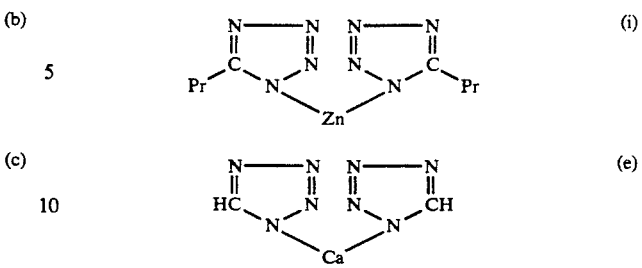

Wherein: Pr is —CH$_2$CH$_2$CH$_3$

EFFECTS OF THE INVENTION

The effects of the present invention are summarized as follows:

(1) The invention of the blowing agents for use with high quality thermoplastic synthetic resins which have a high melting point or high softening point are accomplished by the present invention.

(2) Thermal decomposition of the tetrazole derivatives is complete and the main ingredient of the decomposed gases is nitrogen and thus has no harmful effects on the thermoplastic synthetic resin moldings, for instance, deterioration etc. of the moldings.

(3) It is possible by the present invention to give a foamed structure to the thermoplastic engineering and superengineering plastics which were formerly difficult to produce.

(4) The foamed moldings of the present invention may be formed as fibers, films, sheets or 3-dimensional moldings by using the ordinary molding method, e.g. extrusion, injection, blowing or press molding.

(5) In addition to the characteristics of the engineering and superengineering plastic moldings which themselves have high heat resistance and high mechanical properties, the foamed thermoplastic synthetic resin moldings which are manufactured by the present invention have the characteristics of light and beautiful surface appearance and no shrink and warp.

What we claim is:

1. In a process for the production of cellular products which comprises incorporating a blowing agent into rubber or a synthetic polymer and then heating to activate the blowing agent, the improvement which comprises using as the blowing agent tetrazole compounds represented by the formulae (II), (III) and (V):

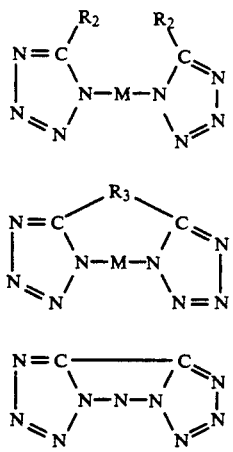

wherein

R₂ is selected from the group consisting of H, —OH, —COOH, —SO₃H, —NO₂, halogen and —NH₄R₅ wherein R₄ and R₅ each are H or $C_1$ to $C_4$ alkyl, $C_1$ to $C_6$ alkyl, $C_3$ to $C_6$ cycloalkyl or $C_2$ to $C_6$ alkenyl, optionally substituted by $C_1$ to $C_6$ alkyl, —OH, —COOH, —SO₃H, —NO₂, halogen, —NR₄R₅ wherein R₄ and R₅ are as defined above or, R₂ can be phenyl, benzyl or phenethyl radicals optionally substituted by 1 to 3 halogen, —OH, NO₂, —NR₄R₅, wherein R₄ and R₅ are as described above, $C_1$ to $C_4$ alkyl and esters or amides of lower carboxylic acids;

R₃ is selected from the group consisting of $C_5$ to $C_6$ alkylene, cycloalkylene or alkenylene, unsubstituted or substituted by $C_1$ to $C_6$ alkyl, —OH, —COOH, SO₃H, —NO₂, halogen, NR₄R₅ wherein R₄ and R₅ are as defined above, —O—, —S—, —SO₂, —CO—, —phenylene or bisphenylene, said phenylene or bisphenylene being unsubstituted or substituted by 1 to 8 halogens, —OH, —NO₂, esters or amides of lower carboxylic acids, NR₄R₅, wherein NR₄ and R₅ are as defined above or $C_1$ to $C_4$ alkyl; and M is a divalent metal selected from Ca, Cu, Zn, Mn, Fe, Co, Ni and Ba.

2. The process of claim 1 which includes heating the polymer containing said tetrazole compounds to a temperature sufficient to decompose the tetrazole compounds.

3. The process of claim 1 which comprises directly adding the tetrazole compound as blowing agent to a synthetic thermoplastic polymer or its components for the production of cellular products.

4. The process of claim 1 which includes, after said incorporating and prior to heating, the step of forming the polymer with the tetrazole compound therein at a temperature less than the decomposition temperature of the tetrazole, into formable chips or pellets.

5. The process of claim 1 in which the blowing agent is employed in an amount of from about 0.01 to about 15 percent by weight of the rubber or synthetic polymer.

* * * * *